United States Patent [19]

Yamabuchi

[11] Patent Number: 5,661,551
[45] Date of Patent: Aug. 26, 1997

[54] OPTICAL RADAR APPARATUS AND ADJUSTING METHOD THEREFOR

[75] Inventor: Hiroshi Yamabuchi, Himeji, Japan

[73] Assignee: Mitsubishi Denki Kabushiki Kaisha, Tokyo, Japan

[21] Appl. No.: 451,033

[22] Filed: May 25, 1995

[30] Foreign Application Priority Data

Jan. 13, 1995 [JP] Japan .................. 7-004146

[51] Int. Cl.$^6$ .................. B60T 7/16; G01C 3/08
[52] U.S. Cl. .................. 356/5.01; 356/4.01; 180/169
[58] Field of Search .................. 356/4.01–5.15

[56] References Cited

U.S. PATENT DOCUMENTS

| | | | |
|---|---|---|---|
| 3,551,050 | 12/1970 | Thorlin | 356/5.1 |
| 3,591,293 | 7/1971 | Maltby et al. | |
| 4,026,654 | 5/1977 | Beaurain | |
| 4,477,184 | 10/1984 | Endo | 356/141.1 |
| 5,510,889 | 4/1996 | Herr | 356/5.1 |

FOREIGN PATENT DOCUMENTS 137867  5/1994  Japan .

Primary Examiner—Stephen C. Buczinski
Attorney, Agent, or Firm—Sughrue, Mion, Zinn, Macpeak & Seas

[57] ABSTRACT

An optical radar apparatus which includes a light emitter for emitting light, a light transmitter and reflector for reflecting and transmitting the light, a reflected light reflector for receiving the light which has Keen reflected by an object, and for reflecting the received light, and a light-responsive device which is located in a horizontal direction from the light emitter, and which receives the light reflected by the reflected light reflector. A rotatable holding member holds the light transmitter and reflector and the reflected light reflector at predetermined positions relative to one another. A scanner rotates the holding member to scan the light in the horizontal direction.

12 Claims, 4 Drawing Sheets

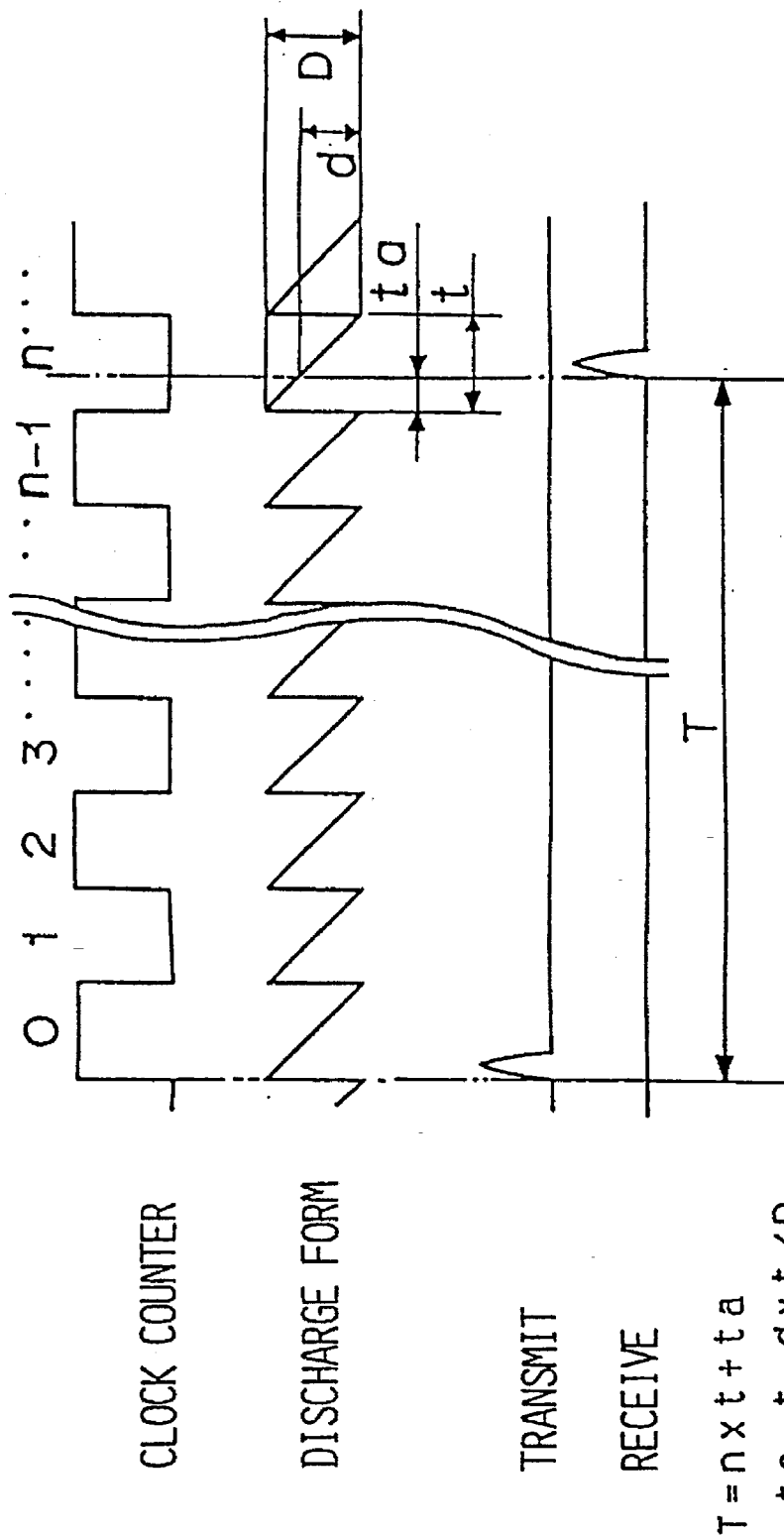

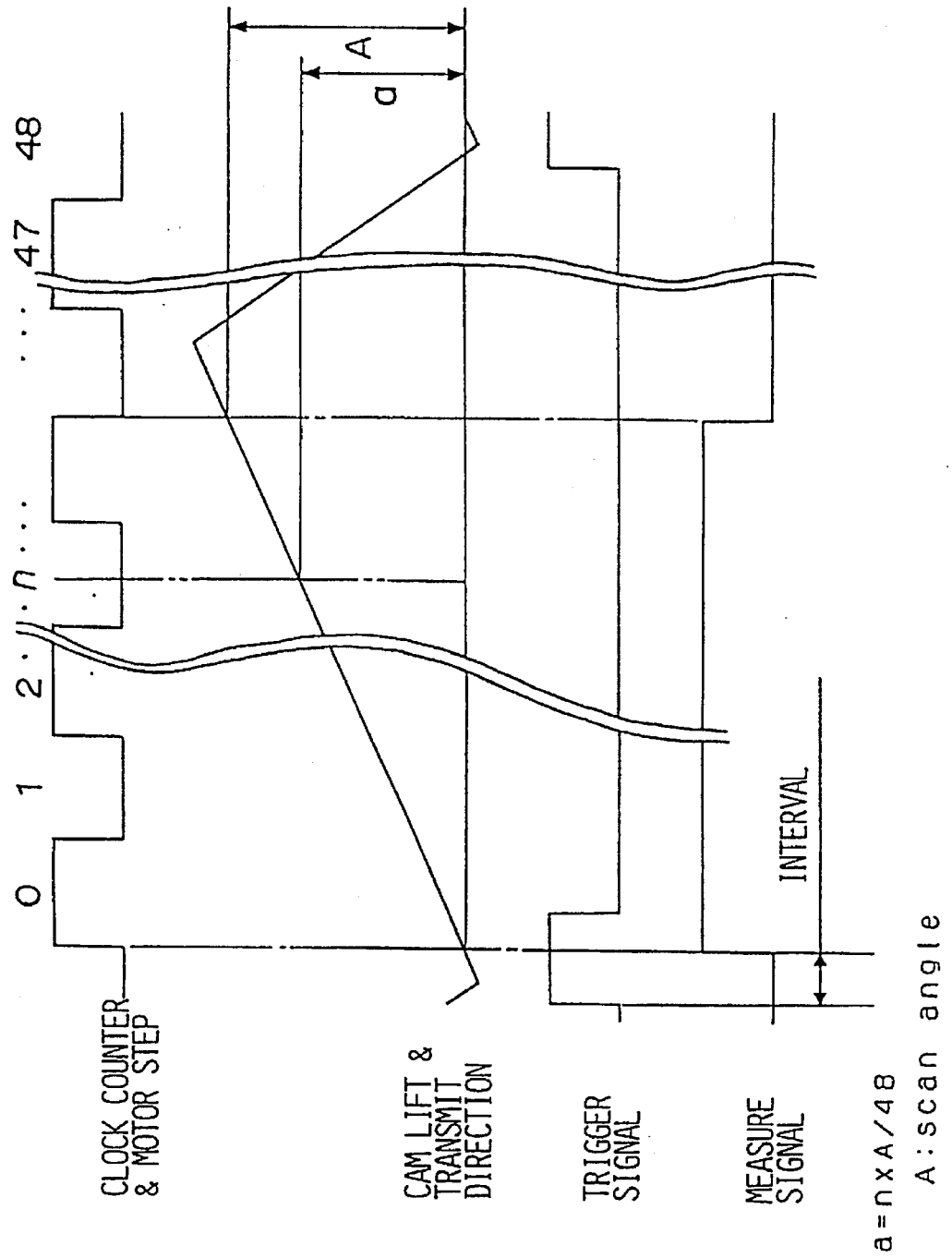

OPTICAL RADAR APPARATUS AND ADJUSTING METHOD THEREFOR

BACKGROUND OF THE INVENTION

FIELD OF THE INVENTION

The present invention relates an optical radar apparatus which scans light in a horizontal direction, and receives the light returned from an object by reflection to detect a distance and a direction to the object.

DISCUSSION OF BACKGROUND

It has been proposed that such an optical radar apparatus is widely used for a vehicle surrounding monitoring device, a vehicle distance controlling device and the like which are carried on vehicles.

It has been regarded as preferable requirements that the optical radar apparatus to be carried on a vehicle is formed to have a small size in the vertical direction and a flat shape. For an example, the arrangement disclosed in Japanese Unexamined Patent Publication No. 137867/1994 is considered to meet the requirements.

However, the arrangement in the publication carries out scanning by reflecting on a mirror only light to be transmitted from a light source to an object. Since the scanning range is limited to a range where a light-responsive optical system can receive the light (a visual field angle of a light-responsive optical system), it is difficult to detect the object over a wide angular range.

Consider how to widen the scanning range of the arrangement of the publication.

It is not possible to make the aperture of a light receiving lens small remarkably because the light receiving lens has to collect as much amount of poor reflected light as possible for photoelectric conversion. The measures to enlarge the visual field angle of the light-responsive optical system are limited to two manners, i.e. to shorten the focal length of the receiving lens, and to make a photo-responsive element larger.

In the case of the reduction in the focal length, enlargement of the visual field angle makes the aperture of the lens short due to the optical limitation (the limitation to the aperture ratio) of the lens, which is not preferable because a decrease in photo-responsive sensitivity of the optical radar apparatus is introduced.

On the other hand, making the photo-responsive element larger introduces a decrease in reception sensitivity of the light-responsive element, which is not preferable in terms of radar performance.

SUMMARY OF THE INVENTION

It is an object of the present invention to solve the problems noted above and to provide an optical radar apparatus capable of having a smaller size in the vertical direction and having a wide scanning range.

It is another object of the present invention to provide an optical radar apparatus capable of reliably receiving reflected light from an object and of preventing outgoing light and the reflected light from interfering each other.

It is still another object of the present invention to provide an optical radar apparatus having a simple structure.

It is a further object of the present invention to provide an optical radar apparatus capable of adjusting the direction of outgoing light easily, and of making the adjustment easily without getting ineffective later.

It is a still further object of the present invention to provide an optical radar apparatus having a small and flat shape.

It is another object of the present invention to provide an optical radar apparatus capable of reliably preventing outgoing light and reflected light from interfering each other.

It is a still further object of the present invention to provide a method for adjusting an optical radar apparatus, capable of the direction of outgoing light easily.

The foregoing and other objects of the present invention have been attained by providing an optical radar apparatus including light emitting means for emitting light; light transmitting and reflecting means for reflecting the light and transmitting the light; reflected light reflecting means for receiving the light which has been reflected by an object, and reflecting the received light; light-responsive means which is arranged to be away from the light emitting means in a horizontal direction, and which receives the light reflected by the reflected light reflecting means; a holding member which holds the light transmitting reflecting means and the reflected light reflecting means at predetermined relative positions, and which is arranged to be rotatable; and scanning means for rotating the holding member to scan the light in the horizontal direction.

The optical radar apparatus can further include distance calculating means for calculating a distance to the object based on a propagation delay time which is between the emission of the light by the light emitting means and the receipt of the reflected light by the light-responsive means.

The optical radar apparatus can further include direction detecting means for detecting a light transmitting direction of the light.

It is preferable that in the optical radar apparatus the light transmitting and reflecting means reflects only the light to be transmitted, the reflected light reflecting means reflects only the reflected light, and the holding member holds the light transmitting and reflecting means and the reflected light reflecting means so as to be substantially 90° apart in the horizontal direction.

The optical radar apparatus can further include light transmitting direction adjusting means which reflects at a predetermined angle the light emitted by the light emitting means and makes the reflected light incident on the light transmitting and reflecting means.

It is preferable that in the optical radar apparatus the light transmitting direction adjusting means comprises a reflecting member for reflecting the light, and a supporting member for supporting the reflecting member, the supporting member being a plate with a hollow portion.

It is preferable that in the optical radar apparatus the light-responsive means is arranged in a light receiving path which the reflected light from the object follows after the reflected light has been reflected by the reflected light reflecting means at an angle of substantially 90°.

Preferably, in the optical radar apparatus, the light transmitting reflecting means and the reflected light reflecting means have shielding means arranged therebetween.

The present invention also has provided a method for adjusting an optical radar apparatus wherein a supporting member which is made of a plate with a hollow portion is plastically deformed to adjust an angle of reflection of a reflecting member supported by the supporting plate.

In accordance with the optical radar apparatus of the present invention, the light generated by the light emitting means is scanned in the horizontal direction by rotating the light transmitting and reflecting means and the reflected light reflecting means with the predetermined relative positions maintained therebetween, and the reflected light from the object comes into the light-responsive means which is arranged to be away from the light emitting means in the horizontal direction. As a result, the size in the vertical direction can be reduced, and the scanning range of the light can be widened.

In an embodiment according to the optical radar apparatus of the present invention, the light transmitting and reflecting means reflects only the light to be transmitted, and the reflected light reflecting means reflects only the reflected light. As a result, the path for transmitting the light and the path for receiving the reflected light can be separated from each other to prevent false detection from occurring due to interference of light.

In addition, the light transmitting and reflecting means and the reflected light reflecting means may be held so as to be substantially 90° apart in the horizontal direction. In this case, even if the light is transmitted in an arbitrary direction, the reflected light reflecting means can reflect the reflected light reflected by the object so as to direct the reflected light into the light-responsive element, reliably receiving the reflecting light from the object.

In an embodiment of the optical radar apparatus of the present invention, the light transmitting direction is adjusted by reflecting at the predetermined angle the light generated by the light emitting means and making the reflected light incident on the light transmitting and reflecting means. As a result, simplification of the apparatus can be realized.

In an embodiment of the optical radar apparatus according to the present invention, the reflecting member which reflects at the predetermined angle the light generated by the light emitting means and makes the light incident on the light transmitting and reflecting means is supported by the supporting member which is made of the plate with the hollow portion. As a result, plastic deformation is easily and sufficient stiffness can be obtained.

In an embodiment of the optical radar apparatus according to the present invention, the light-responsive means is arranged in the light receiving path which the reflected light from the object follows after the reflected light has been reflected by the reflected light reflecting means at an angle of substantially 90°. The arrangement can make the apparatus smaller and flatter.

In an embodiment of the optical radar apparatus according to the present invention, the shielding means can prevent the light transmitted by the light transmitting and reflecting means from being received by the light-responsive means to avoid false detection of the object.

In accordance with the method for adjusting an optical radar apparatus according to the present invention, the supporting member which is made of the plate with the hollow portion can be plastically deformed to easily adjust the angle of reflection of the reflecting member supported by the supporting member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a timing chart showing an example of the operation of the distance calculating means in the present invention; and FIG. 5 is a timing chart showing an example of the operation of the direction detecting means in the present invention.

DESCRIPTION OF THE PREFERRED EMBODIMENTS

Figure 1:
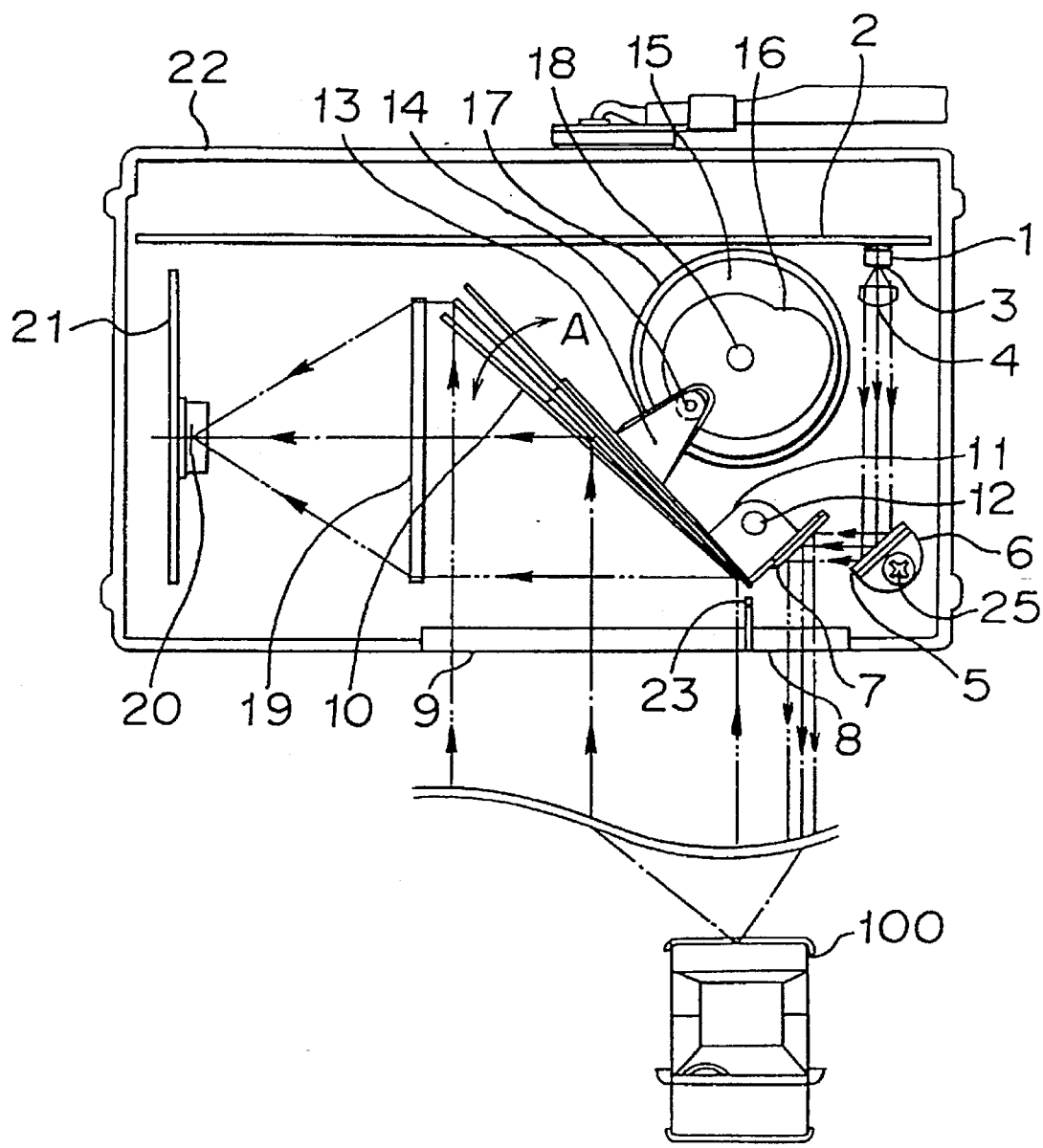
FIG. 1 is a horizontal sectional view showing the structure of an embodiment according to the present invention.
Figure 2:
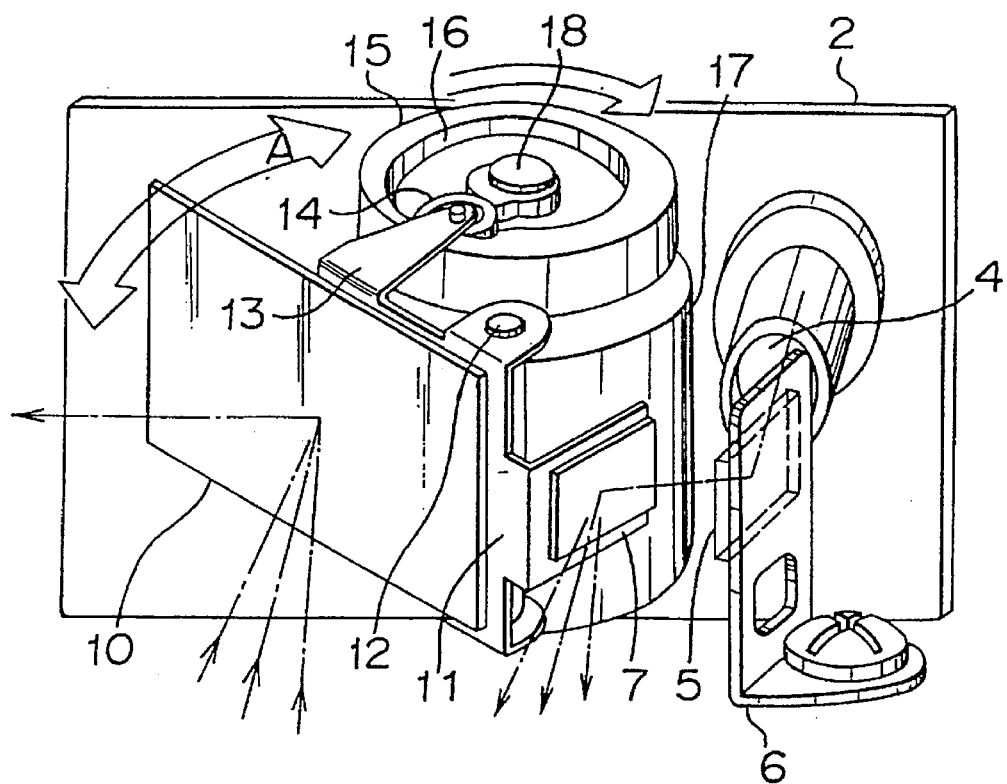
FIG. 2 is a perspective view showing the essential parts of the embodiment.

FIG. 1 is a horizontal sectional view showing the internal structure of an embodiment of the optical radar apparatus according to the present invention. This type of radar apparatus is carried on e.g. a front end of a vehicle to detect an object in front of the vehicle. FIG. 2 is a perspective view showing the essential parts of the optical radar shown in FIG. 1. Now, the embodiment will be explained in detail in reference to the accompanying drawings.

In Figures, reference numeral 1 designates a laser diode as an example of light emitting means to emit a laser beam. Reference numeral 2 designates a main substrate on which a light emitting circuit to drive the laser diode, and other electric circuits such as distance calculating means, direction detecting means and step motor driving means are put. The reference numeral 3 designates a light emitting source which is held in the laser diode 1. Reference numeral 4 designates a convex lens which is used to adjust an angle of diffusion of the emitted laser beam. Reference numeral 5 designates a mirror as an example of a reflecting member which reflects the laser beam from the convex lens 4 at a predetermined angle. Reference numeral 6 designates a supporter which is a supporting member for supporting the mirror 5. The mirror 5 and the supporter 6 constitute a light transmitting direction adjusting means which adjusts the direction of the light to be transmitted from the optical radar apparatus. The light transmitting direction adjusting means can change the direction of the mirror 5 to make such adjustment that the laser beam transmitted from the optical radar apparatus is in parallel to the reflected light returned from an object by reflection.

Reference numeral 7 designate a mirror as an example of light transmitting and reflecting means which receives the laser beam reflected by the mirror 5 and reflects the reflected laser beam. The laser beam passes through a glass plate 8 to be transmitted out from the optical radar apparatus. The transmitted laser beam is reflected by a preceding vehicle 100 as an example of the object. The reflected light passes through a glass plate 9 and is received and reflected by a mirror 10 as an example reflected light reflecting means which has a larger area than the mirror 7. In FIG. 1, the wavy lines depicted between the optical radar apparatus and the preceding vehicle 100 represent that the distance between the optical radar apparatus and the preceding vehicle 100 which is actually long is shown in a shortened form.

Reference numeral 11 designates an L-shaped rigid member which is a holding member to hold the mirror 7 and the mirror 10 at predetermined relative positions, e.g. at an angle of substantially 90° therebetween in the horizontal direction. The rigid member has such an shape that a plate-like member is bent at 90° and the L-shaped rigid member has one side formed longer than the other side. The mirror 7 is fixed on the shorter side of the L-shaped rigid member. The mirror 10 is fixed on the longer side of the L-shaped rigid member. Those three members, i.e. the mirror 7, the mirror 10 and the rigid member 11, are formed as one unit, and constitute a single rigid structure.

Reference numeral 12 designates a rotary shaft of the rigid member 11. The rigid member 11 is held so as to be rotatable around the rotary shaft 12. Reference numeral 13 designates a tongue-shaped projection which is provided on the longer side of the rigid member 11, and which has a leading edge provided with a roller-shaped follower 14. The follower 14 cooperates with a pressing device (not shown) which comprises e.g. a spring, and the pressing device presses the follower 14 against an edge surface of a cam groove 16 formed in a cam 15. Reference numeral 17 designates a step motor which drives the cam 15 for rotation. Reference numeral 18 designates a driving shaft of the step motor 17 which has the cam 15 fixed thereto.

Reference numeral 19 designates a Fresnel lens which condenses the light reflected by the mirror 10. Reference numeral 20 is a photo-responsive element as an example of light receiving means which is arranged in the vicinity of the focal position of the Fresnel lens 19, and which receives the reflected light condensed by the Fresnel lens 19 and outputs an electrical signal depending on the strength of the received light. Reference numeral 21 designates a sub-substrate which has the photo-responsive element 20 carried thereon, and which includes a received signal amplifier circuit to amplify an electrical signal obtained by photoelectric conversion.

The photo-responsive element 20 is arranged to be away from the laser diode 1 in the horizontal direction. In order to receive the light reflected by the mirror 10, the photo-responsive element 20 is placed in a reflected light receiving path which the reflected light returning directly in front of the optical radar apparatus follows after the reflected light has been arrived at and reflected by the mirror 10 at an angle of substantially 90° to the left direction in FIG. 1.

Reference numeral 22 designates a shell as an example of housing, which forms an outer wall of the optical radar apparatus together with the glass plates 8 and 9. Reference numeral 23 designates a shielding member as an example of shielding means, which is arranged so as to partition the mirror 7 and the mirror 10 in order to prevent the outgoing laser from interfering with the reflected light from the object, and which avoids leakage of the outgoing light toward the photo-responsive element.

Figure 3:
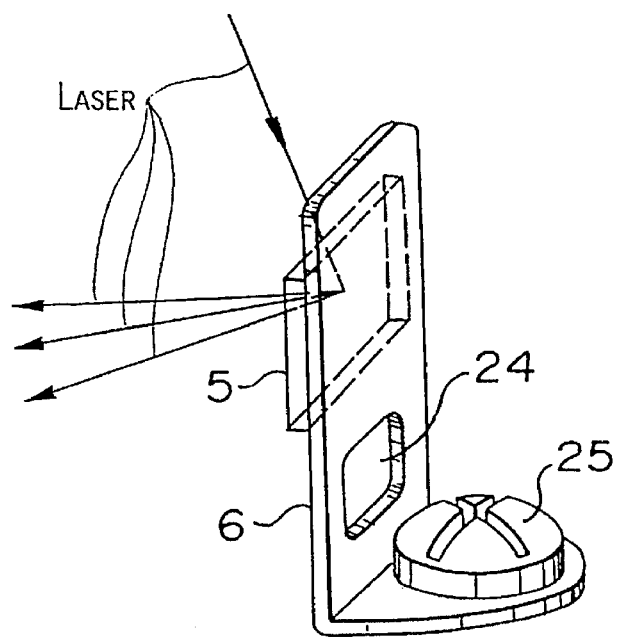
FIG. 3 is a perspective view showing the structure showing the light transmitting direction adjusting means according to an embodiment of the present invention.

FIG. 3 is a perspective view showing the light transmitting direction adjusting means which is constituted by the mirror 5 and the supporter 6. The supporter 6 has such a shape that a plate is bent in an L-shape, and the L-shaped supporter has one side formed with a hollow portion 24. The side of the supporter 6 which is formed with the hollow portion 24 has the mirror 5 fixed thereon by fixing means not show, e.g. an adhesive. The L-shaped supporter 6 has the other side formed with a hole not shown, and the supporter 6 is fixed to the shell 22 by a screw 25 which passes through the hole.

In operation, the laser diode 1 is driven by the light-emitting circuit on the main substrate 2 to generate a laser. The generated laser is radiated in such a manner that its luminous flux is shaped by the convex lens 4 to have a predetermined spreading angle. The convex lens 4 is formed in such a manner that the luminous flux of the laser has a spreading angle of about 0.1 deg in the horizontal direction and about 4 deg in the vertical direction. The shaped laser is reflected at an angle of substantially 90° to the left direction in FIG. 1 by the mirror 5, comes to the mirror 7 and is reflected by the mirror 7. The laser beam reflected by the mirror 7 passes through the glass plate 8 and is transmitted ahead of the optical radar apparatus. At that time, the shielding member 23 shields the laser from leaking into the side of the photo-responsive element 20 due to the reflection in the optical radar apparatus to prevent the photo-responsive element 20 from undergoing false detection.

The laser thus transmitted irradiates the preceding vehicle 100 as the object in front of the optical radar apparatus, and is reflected by the preceding vehicle.

The path which the laser generated by the light emitting source 3 follows, and which includes the convex lens 4, the mirror 5, the mirror 7, the glass plate 8 and the preceding vehicle 100 forms, a light transmitting path for the laser.

The laser reflected by the preceding vehicle 100 has a portion returned to the optical radar apparatus and the other portions reflected to various directions. The reflected light returned to the optical radar apparatus passes through the glass plate 9, and comes to and is reflected by the mirror 10. The light thus reflected comes into the Fresnel lens 19, is condensed by the Fresnel lens 19, and produces an image on a photo-responsive surface of the photo-responsive element 20 arranged in the vicinity of the focal distance of the Fresnel lens. The photo-responsive element 20 carries out photoelectric conversion to output an electrical signal depending on the strength of the received light. The received signal amplifier circuit on the sub-substrate 21 amplifies the electrical signal which has been subjected to such photoelectric conversion, and transmits a photo-responsive signal to the main substrate. The path which the reflected light reflected by the preceding vehicle 100 follows, and which includes the glass plate 9, the mirror 10, the Fresnel lens 19 and the photo-responsive element 20 forms a light receiving path.

The distance calculating means which is carried on the main substrate 2 and which operates as schematically shown in FIG. 4 determines a time period during which a photo-responsive signal generates since the light emitting circuit has driven the laser diode 1. The distance calculating means regards the determined time period as a time required for a laser to go to and from the preceding vehicle 100, i.e. a propagation delay time. The distance calculating means calculates a distance to the preceding vehicle 100 based on the propagation delay time.

The direction detecting means which is carried on the main substrate 2 and which operates as schematically shown in FIG. 5 detects the light transmitting direction of the laser based on a rotary angular position of the step motor 17 and a profile (shape) of the cam groove 16.

Now, scanning the laser in the horizontal direction will be explained.

The step motor driving means which is carried on the main substrate 2 and which is not shown in the figures supplies the step motor 17 with a driving signal whenever the object detection process has been completed, or whenever a predetermined period of time has passed. The cumulative total of the number of supplying such driving signals is counted by a counter as counting means not shown in the figures. The counted value is supplied to the direction detecting means, and the direction detecting means calculates a rotary angular position of the step motor 17 based on the counted value. The step motor 17 rotates the driving shaft 18 through a predetermined angle whenever the respective driving signals are given. The cam 15 which is fixed on the driving shaft 18 rotates through the predetermined angle in synchronization with the driving shaft as well. Rotation of the cam 15 causes the cam groove 16 to rotate. As the follower 14 gets in sliding contact with the cam groove 16, the rotation of the cam groove 16 makes the distance between the follower 14 and the driving shaft 18 changed. This change is transmitted through the projection 13 to the rigid structure constituted by the mirrors 7 and 10 and the rigid member 11. The rigid structure of those three members is rotated around the rotary shaft 12 as one unit as indicated by arrows A in FIG. 1.

The step motor driving means not shown, the step motor 17, the cam 15, the cam groove 16, the follower 14 and the projection 13 cooperate together to constitute scanning means.

In accordance with the optical radar apparatus constructed in this way, the laser transmitted from the optical radar apparatus and the reflected light from the object are adjusted by the mirror 5 so as to be in parallel with each other, and the mirrors 7 and 10 are rotated as one unit while the mirrors are substantially 90° apart in the horizontal direction. As a result, whichever direction the laser is transmitted by rotating the rigid member 11, it is possible to reliably receive the reflected light from the object into the photo-responsive element 20.

Since it is theoretically possible to detect an object when the incident angle of light coming to the mirror 7 is greater than 0° and smaller than 90°, an extremely wide scanning range can be obtained.

Next, a method for adjusting the light transmitting direction adjusting means will be described.

The simplest way appears to tighten the screw 25 after the direction of the supporter 6 has been adjusted. However, when the screw is tightened, the supporter 6 is in fact rotated together with the screw, causing the adjustment to get ineffective. If a tightening force is a degree to which the supporter 6 does not rotate together with the screw 25, the screw 25 could slacken due to vibrations, causing the adjustment to get ineffective. The measure to fix the supporter 6 on the shell 22 by an adhesive is not preferable in terms of an increase in production steps and reliability.

In accordance with the present invention, the direction of the supporter 6 is roughly adjusted, and then the screw 25 is completely tightened up. Next, the supporter 6 is plastically deformed by twisting the supporter 6 in the horizontal direction so that the light transmitted from the optical radar apparatus and the reflected light are in parallel with each other. The twisting direction is preferably the same as the tightening direction of the screw 25.

The plastic deformation can be done easily because the supporter 6 is formed with the hollow portion 24. Since two rigid members which is formed by the provision of the hollow portion 24 supports the mirror 5, sufficient rigidity can be obtained.

Although in the embodiment there is only one hollow portion, it is possible to provide a plurality of hollow portions.

Although in the embodiment the mirrors 7 and 10, and the rigid member 11 are constructed as one unit by combining separate members, the mirrors and the rigid member can be constituted by a single piece.

Such an arrangement can be obtained by e.g. forming the rigid member 11 with a metallic material, and depositing tin on two sides of the rigid member bent in an L-shape.

There may be provided an arrangement that the rigid member 11 has the L-shaped sides shortened in length in the horizontal direction to occupy only positions close to the L-shaped bent portion, and the mirrors 7 and 10 provide the L-shaped structure. In that case, the tongue-shaped projection 14 is attached to one of the mirrors.

As explained, in accordance with the embodiment, the constituent parts of the optical radar apparatus are arranged to be spaced in the horizontal direction. As a result, it is not necessary for the optical radar apparatus to have a great size in the vertical direction, and a flat and thin type of optical radar apparatus can be obtained.

Not only the transmitted light of the laser but also the reflected light can be scanned to obtain a wide scanning range.

In addition, the light transmitting path and the light receiving path can be independently provided to prevent interference from occurring.

The provision of the light transmitting direction adjusting means can adjust the light to be transmitted and the reflected light to be in parallel with each other and to make the apparatus simpler.

Specifically, if the light transmitting direction adjusting means is not provided, the constituent parts such as the laser diode 1 and the convex lens 4 have to be arranged in the right direction of the mirror 7 in FIG. 1. Such an arrangement requires not only an additional substrate to carry such constituent parts thereon besides the main substrate 2 and the sub-substrate 21, but also signal lines for sending and receiving signals among the substrates.

On the other hand, the embodiment of the present invention has such an arrangement that the laser diode 1 is put on the main substrate and that the light emitted from the laser diode 1 is reflected by the light transmitting direction adjusting means to make the laser come into the mirror 7 from the right direction in FIG. 1. This arrangement not only requires no additional substrate or signal lines but also can make the apparatus smaller.

In the arrangement of the embodiment, the light-responsive means is arranged in the light receiving path which the reflected light from the object follows after the reflected light has been reflected by the mirror 10 at an angle of substantially 90°, i.e. at a position which is substantially 90° apart to the left direction in FIG. 1 in reference to the reflected light returning from just in front of the optical radar apparatus, allowing the apparatus to be made smaller. This advantage can be easily understood in comparison with a case wherein the photo-responsive element 20 is put on the main substrate 2.

In the latter case, another mirror is required in order to make the reflected light from the mirror 10 come into the photo-responsive element 20. The additional mirror is arranged so as to be inclined at 45° toward an upper left direction in FIG. 1. The additional mirror requires to have a great area because the additional mirror has to reflect the reflected light from the mirror 10 in the entirety. Housing the additional mirror requires to make the shell 22 larger. In addition, the Fresnel lens 19 has to be arranged between the new mirror and the photo-responsive element 20. The photo-responsive element 20 is required to be arranged in the vicinity of the focal position of the Fresnel lens 10. This means that the size of the shell 22 in the vertical direction in FIG. 1 gets larger by an increase in size required by providing the new mirror so as to be inclined toward the upper left direction in FIG. 1 and the size required for the focal length of the Fresnel lens 19.

To the contrary, it is evident that the structure as shown in FIG. 1 can make the apparatus smaller.

Obviously, numerous modifications and variations of the present invention are possible in light of the above teachings. It is therefore to be understood that within the scope of the appended claims, the invention may be practiced otherwise than as specifically described herein.

What is claimed is:

1. An optical radar apparatus including:

light emitting means for emitting light;

light transmitting and reflecting means for reflecting and transmitting the light;

reflected light reflecting means for receiving the light which has been reflected by an object, and reflecting the received light;

light-responsive means, located in a horizontal direction from the light emitting means, for receiving the light reflected by the reflected light reflecting means;

a horizontally rotatable holding member for holding the light transmitting and reflecting means and the reflected light reflecting means at predetermined positions relative to one another; and scanning means for rotating the holding member to scan the light in the horizontal direction.

2. An optical radar apparatus according to claim 1, further including distance calculating means for calculating a distance to the object based on a propagation delay time between the emission of the light by the light emitting means and the receipt of the reflected light by the light-responsive means.

3. An optical radar apparatus according to claim 1, further including direction detecting means for detecting a light transmitting direction of the light.

4. An optical radar apparatus according to claim 2, further including direction detecting means for detecting a light transmitting direction of the beam.

5. An optical radar apparatus according to claim 1, wherein the light transmitting and reflecting means reflects only the light to be transmitted, the reflected light reflecting means reflects only the reflected light, and the holding member holds the light transmitting and reflecting means and the reflected light reflecting means so as to be substantially 90° relative to one another in the horizontal direction.

6. An optical radar apparatus according to a claim further including light transmitting direction adjusting means which reflects at a predetermined angle the light emitted by the light emitting means and makes the reflected light incident on the light transmitting and reflecting means.

7. An optical radar apparatus according to claim 6, wherein the light transmitting direction adjusting means comprises a reflecting member for reflecting the light, and a supporting member for supporting the reflecting member, the supporting member being a plate with a hollow portion.

8. An optical radar apparatus according to claim 1, wherein the light-responsive means is arranged in a light receiving path which the reflected light from the object follows after the reflected light has been reflected by the reflected light reflecting means at an angle of substantially 90°.

9. An optical radar apparatus according to claim 1, wherein the light transmitting and reflecting means and the reflected light reflecting means have a shielding means arranged therebetween.

10. A method for adjusting an optical radar apparatus, comprising:

emitting light;

reflecting firstly the light at a predetermined angle using a reflecting member supported by a supporting member made of a plastic plate with a hollow portion;

deforming the supporting member to adjust an angle of reflection of the reflecting member supported by the supporting member;

reflecting secondly and transmitting the first reflected light using a light transmitting and reflecting means;

receiving the light which has been reflected by an object, and reflecting thirdly the received light using a reflected light reflecting means;

holding the light transmitting and reflecting means and the reflected light reflecting means at predetermined positions relative to one another using a holding member;

horizontally rotating the holding member to scan the second reflected light in the horizontal direction; and receiving the third reflected light, and converting the third reflected light into an electrical signal;

wherein the light is emitted, transmitted, reflected and received in substantially the same horizontal plane.

11. An optical radar apparatus according to claim 1, wherein said scanning means includes:

a tongue-shaped projection projecting from said holding member;

a cam having a groove and being fixed on a shaft;

a step motor for driving said cam; and a follower located on the projected end of said tongue-shaped projection and pressed against the cam groove.

12. An optical radar apparatus according to claim 11, wherein said the light transmitting direction is based on a rotary angular position of said step motor and a profile of the cam groove.

* * * * *